(12) United States Patent
Petersen et al.

(10) Patent No.: US 7,065,102 B1
(45) Date of Patent: Jun. 20, 2006

(54) SYSTEM AND METHOD FOR CORRELATING REQUEST AND REPLY PACKETS

(75) Inventors: David C. Petersen, Campbell, CA (US); Vladimir A. Sukhanov, Cupertino, CA (US)

(73) Assignee: Network General Technology, George Town (KY)

( * ) Notice: Subject to any disclaimer, the term of this patent is extended or adjusted under 35 U.S.C. 154(b) by 963 days.

(21) Appl. No.: 10/090,315

(22) Filed: Mar. 1, 2002

(51) Int. Cl.
*H04J 3/16* (2006.01)
(52) U.S. Cl. ............................ 370/469; 711/216
(58) Field of Classification Search .............. None
See application file for complete search history.

(56) References Cited

U.S. PATENT DOCUMENTS

| | | | |
|---|---|---|---|
| 5,764,912 A * | 6/1998 | Rosborough | 709/224 |
| 6,308,211 B1 * | 10/2001 | Rosborough et al. | 709/224 |
| 6,321,264 B1 * | 11/2001 | Fletcher et al. | 709/224 |
| 6,363,477 B1 * | 3/2002 | Fletcher et al. | 713/151 |
| 6,393,118 B1 * | 5/2002 | Bhusri | 379/219 |
| 6,493,754 B1 * | 12/2002 | Rosborough et al. | 709/224 |
| 2002/0110091 A1 * | 8/2002 | Rosborough et al. | 370/252 |
| 2003/0014662 A1 * | 1/2003 | Gupta et al. | 713/200 |

\* cited by examiner

*Primary Examiner*—Duc Ho
(74) *Attorney, Agent, or Firm*—Fenwick & West LLP

(57) ABSTRACT

A system, method and computer program product are provided for correlating request packets and reply packets during network analysis. Initially, first information is monitored associated with at least one layer of a request packet that resides above a data link control layer thereof. Further monitored is second information associated with at least one layer of a reply packet that resides above the data link control layer thereof. The request packet and the reply packet are then correlated utilizing the first information and the second information. A network is then analyzed based on the correlated request packet and reply packet.

7 Claims, 6 Drawing Sheets

SYSTEM AND METHOD FOR CORRELATING REQUEST AND REPLY PACKETS

FIELD OF THE INVENTION

The present invention relates to network analyzers, and more particularly to correlating request and reply packets for the purpose of analyzing a network.

BACKGROUND OF THE INVENTION

Network assessment tools referred to as "analyzers" are often relied upon to analyze networks communications at a plurality of layers. One example of such analyzers is the Sniffer® device manufactured by Network Associates®, Inc. Analyzers have similar objectives such as determining why network performance is slow, understanding the specifics about excessive traffic, and/or gaining visibility into various parts of the network.

In use, network analyzers often take the form of a program that monitors and analyzes network traffic, detecting bottlenecks and problems. Using this information, a network manager can keep traffic flowing efficiently. A network analyzer can also be used legitimately or illegitimately to capture data being transmitted on a network. For example, a network router reads every packet of data passed to it, determining whether it is intended for a destination within the router's network or whether it should be passed further along the Internet. A router with a network analyzer, however, may be able to read the data in the packet as well as the source and destination addresses. It should be noted that network analyzers may also analyze data other than network traffic. For example, a database could be analyzed for certain kinds of duplication, etc.

Network communication between network devices takes place according to communication protocols, i.e., sets of rules that are agreed upon for the communication which the network devices taking part in the network communication must observe. For monitoring communication networks, and particularly for testing communication networks following the replacement of a network device or the extension of the network by further network devices, network analyzers must be able to decode the network communications in light of the protocol used.

Prior art FIG. 1 illustrates one known prior network analyzer methodology 10. As shown, a plurality of packets 12 are collected and stored in a capture file for subsequent analysis. A shown, such packets 12 include both request packets and reply packets. In use, both the request and reply packets must be decoded in order to properly analyze an associated network. Unfortunately, information that is often required to adequately decode the reply packets is only resident in the associated request packets. Thus, it is necessary to correlate the request and reply packets, before network communications may be analyzed.

In order to accomplish this in the context of the present network analyzer methodology 10 of FIG. 1, source and destination information 14 associated with a data link control (DLC) layer of the packets 12 is monitored and tracked for the purpose of identifying request packets associated with reply packets, so that all of the information is available for proper decoding of the reply packets.

Prior art FIG. 1A illustrates a problem 20 that arises when correlating request and reply packets using the network analyzer methodology 10 of FIG. 1. As shown, a request packet may be sent utilizing a first physical circuit 22, while an associated reply packet is received on a second physical circuit 24. This phenomena often results from the use of various load-balancing techniques known in the art, and is becoming more and more prevalent. Further, this type of occurrence happens prevalently in the context of broadcasting and multicasting.

Unfortunately, the network analyzer methodology 10 of FIG. 1 breaks down as a result of the phenomena set forth in FIG. 1A. In particular, the first physical circuit 22 and the second physical circuit 24 involve different switches 26 which, in turn, have different addresses. To this end, the source and destination information associated with the DLC layer is different for the request and reply packets. Thus, the correlation technique of the network analyzer methodology 10 of FIG. 1 no longer works properly.

There is thus a need for a technique of correlating request and reply packets in the context of analyzing networks which overcomes the problems of the prior art.

DISCLOSURE OF THE INVENTION

A system, method and computer program product are provided for correlating request packets and reply packets during network analysis. Initially, first information is monitored associated with at least one layer of a request packet that resides above a data link control layer thereof. Further monitored is second information which is associated with at least one layer of a reply packet that resides above the data link control layer thereof. The request packet and the reply packet are then correlated utilizing the first information and the second information. A network is then analyzed based on the correlated request packet and reply packet.

In one embodiment, the first information and the second information may include a key. Further, the key may include information at a remote procedure call layer. In particular, the information may be included in an XID field.

In another embodiment, data associated with the request packet may be stored. As an option, the data may be stored in a hash table. In use, the data may be retrieved utilizing the second information (i.e. a key) associated with the reply packet. This way, data that is included in the request packet and is required for the analysis of the associated reply packet may be accessed when required.

In still another embodiment, the analysis may include decoding the request packet and the reply packet. As such, the network may be analyzed based on the decoded request packet and the reply packet.

BRIEF DESCRIPTION OF THE DRAWINGS

Prior art

Prior art

DESCRIPTION OF THE PREFERRED EMBODIMENTS

Figure 1:
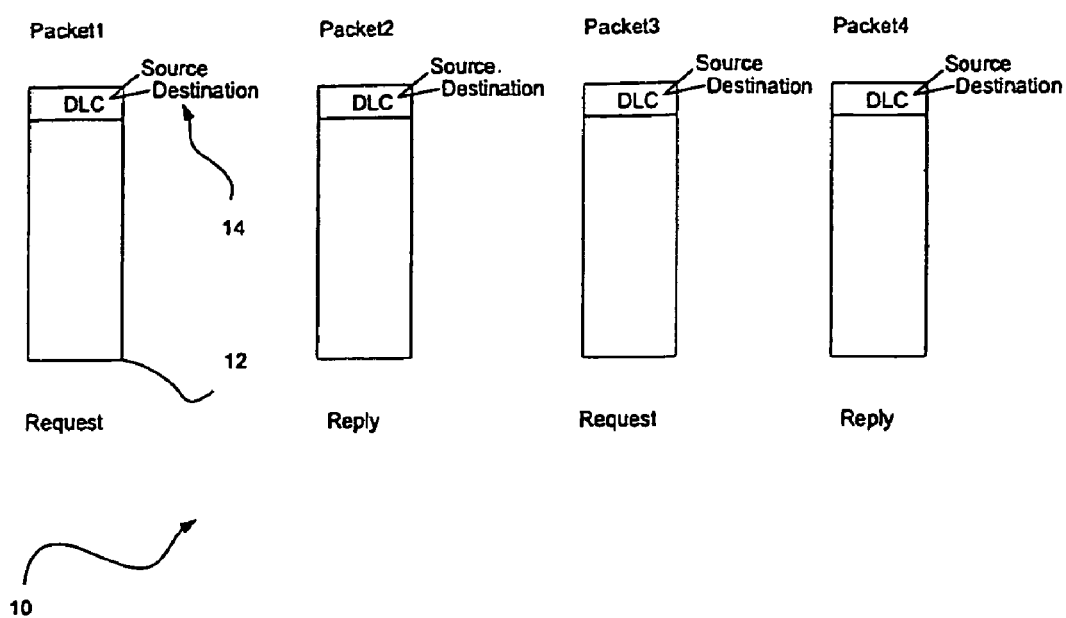
FIG. 1 illustrates one known prior network analyzer methodology.
Figure 1A:
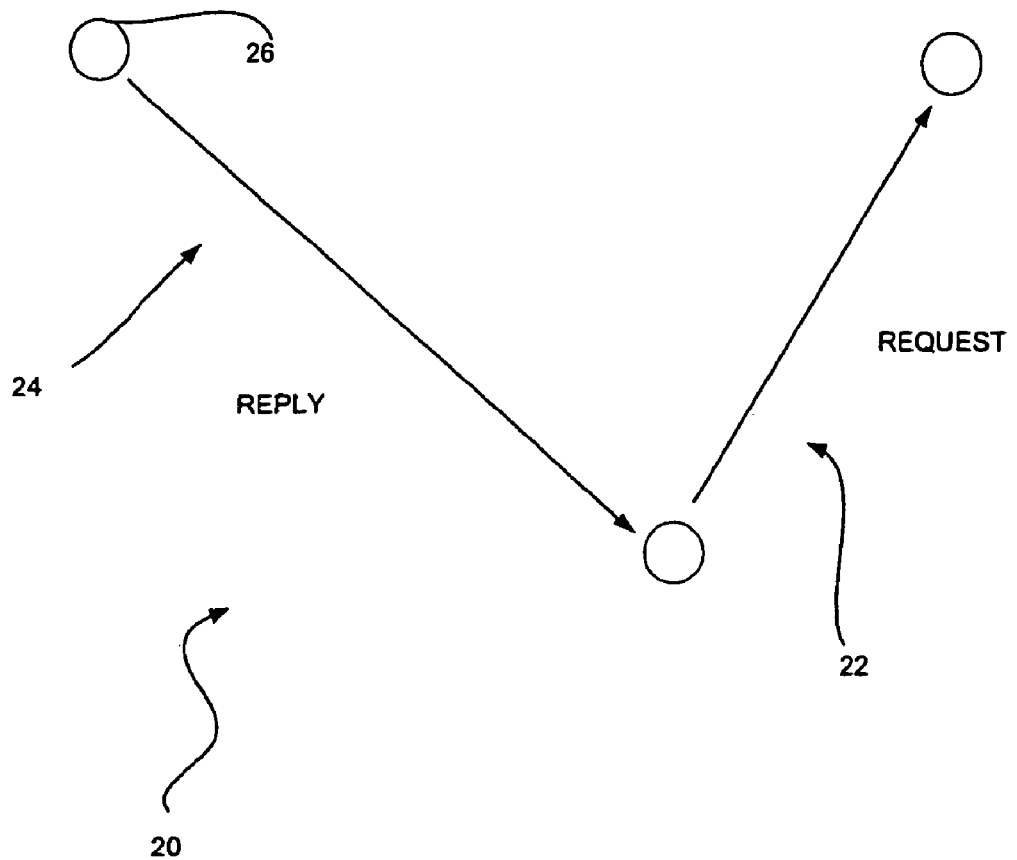
FIG. 1A illustrates a problem that arises when correlating request and reply packets using the network analyzer methodology of FIG. 1.
Figure 1B:
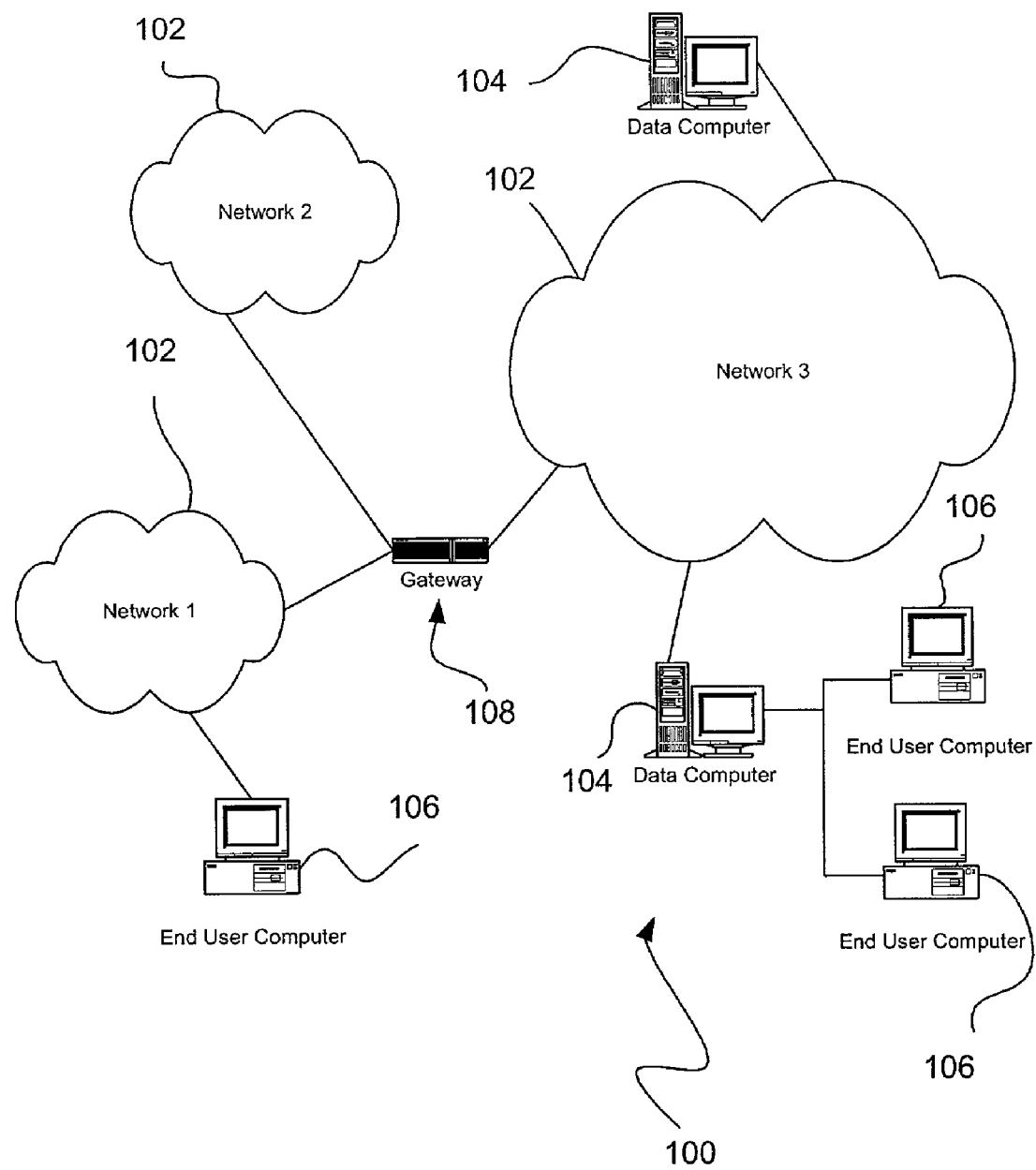
FIG. 1B illustrates an exemplary network environment, in accordance with one embodiment.

FIG. 1B illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data servers 104 which are capable of communicating over the networks 102. Also coupled to the networks 102 and the data servers 104 is a plurality of end user computers 106. In the context of the present description, such end user computers 106 may include a web server, desktop computer, lap-top computer, hand-held computer, printer or any other type of hardware/software.

In order to facilitate communication among the networks 102, at least one gateway 108 is coupled therebetween. It should be noted that each of the foregoing network devices as well as any other unillustrated devices may be interconnected by way of a plurality of network segments. In the context of the present description, a network segment includes any portion of any particular network capable of connecting different portions and/or components of a network.

Resident on any of the foregoing components may be a network assessment tool such as a network analyzer. Such network analyzer may be relied upon to analyze networks communications at a plurality of layers. One example of such analyzer is the Sniffer® device manufactured by Network Associates®, Inc. In use, the analyzer may collect information for the purpose of determining why network performance is slow, understanding the specifics about excessive traffic, and/or gaining visibility into various parts of the network.

To accomplish this, the network analyzer may be capable of correlating request packets and reply packets during network analysis. To accomplish this, the network analyzer may be equipped with a segmentation and reassembly (SAR) engine that is capable of correlating request packets and reply packets for decoding the same to analyze a network.

In use, first information (i.e. a key) is initially monitored which is associated with at least one layer of a request packet that resides above a data link control layer thereof. Further monitored is second information (i.e. the key) associated with at least one layer of a reply packet that resides above the data link control layer thereof.

The request packet and the reply packet are then correlated utilizing the first information and the second information. The network may then be analyzed based on the correlated request packet and reply packet. By this design, the present embodiment is immune to the phenomena set forth in Prior Art FIG. 1A, since layers above the data link control layer are not affected by situations involving two physical circuits. More information relating to a specific implementation of such network analyzer will be set forth hereinafter in greater detail.

Figure 2:
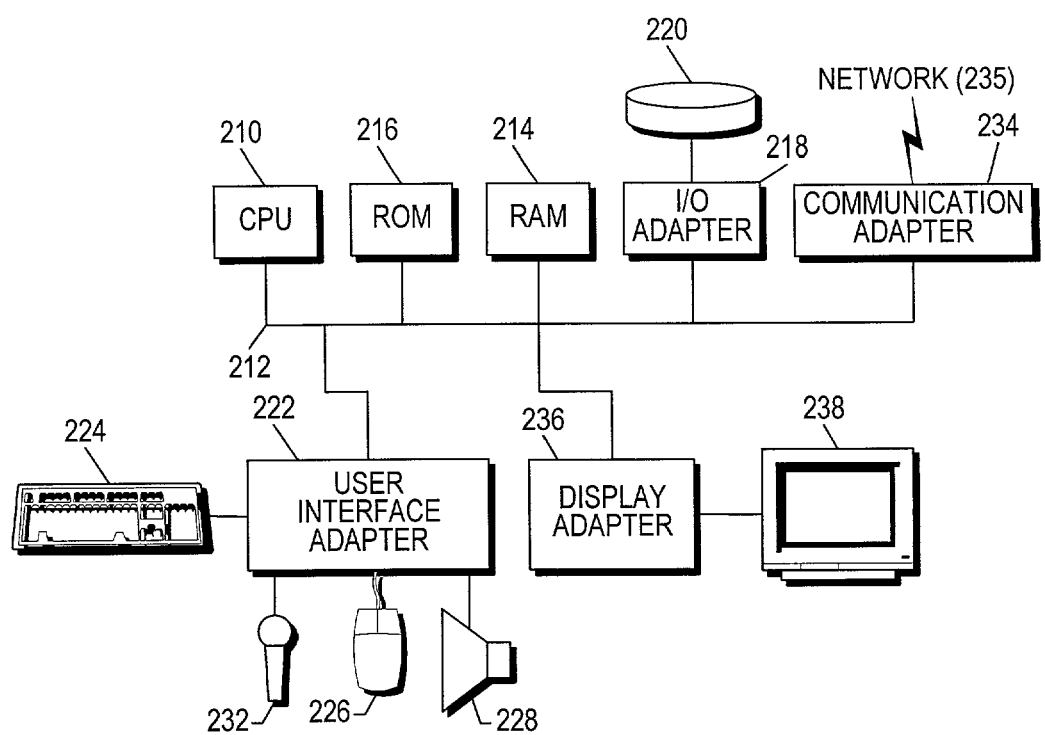
FIG. 2 shows a representative hardware environment associated with the computers of FIG. 1B.

FIG. 2 shows a representative hardware environment that may be associated with the data servers 104 and/or end user computers 106 of FIG. 1B, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3:
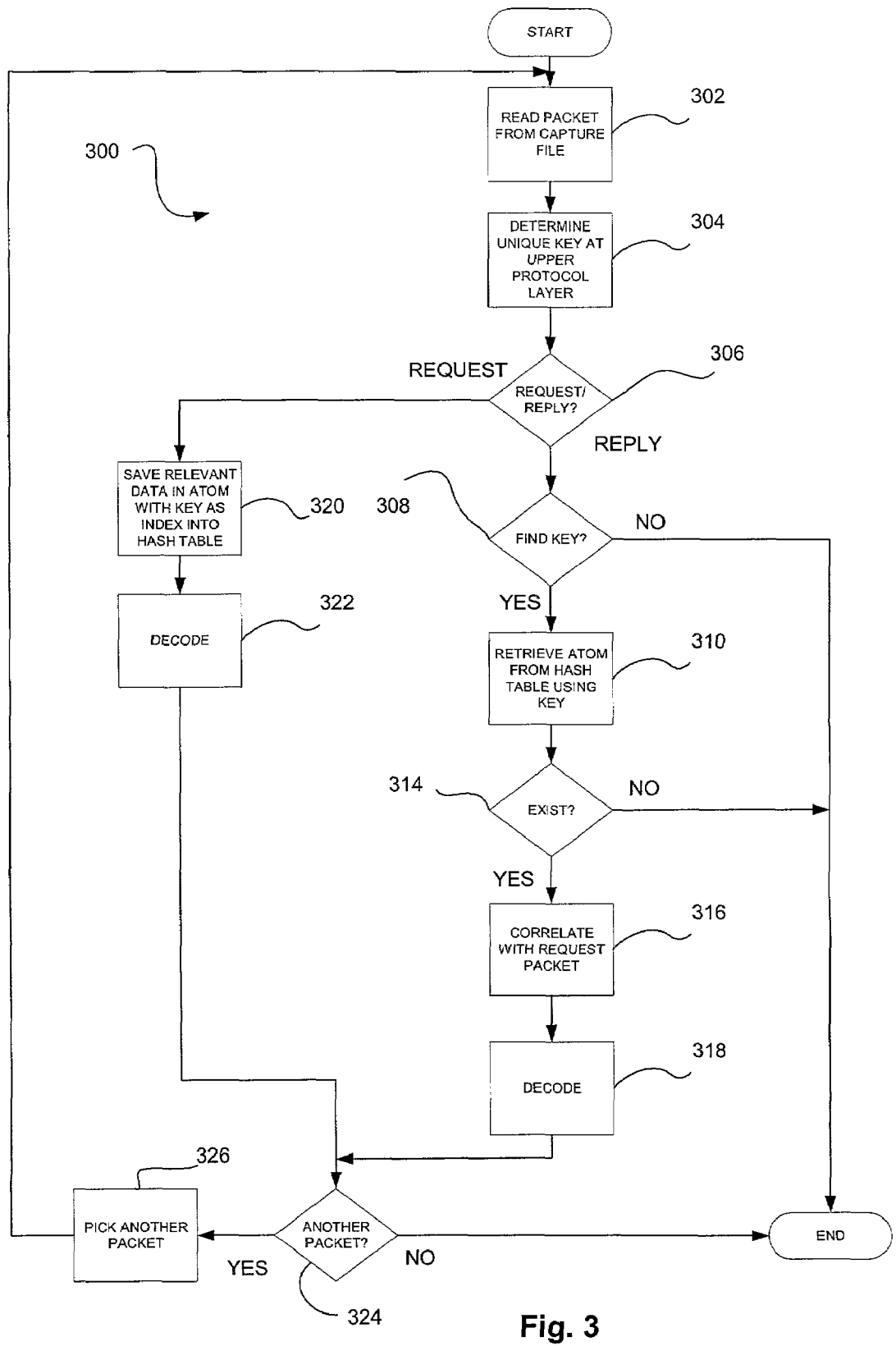
FIG. 3 is a method for correlating request packets and reply packets during network analysis, in accordance with one embodiment.

FIG. 3 is a method 300 for correlating request packets and reply packets during network analysis, in accordance with one embodiment. The method 300 may be implemented in the context of the architecture of FIGS. 1B and 2. Of course, however, the method 300 may be implemented in any desired environment.

Initially, in operation 302, a packet is read from a capture file. In the context of the present invention, a packet may refer to any component of a network communication. In one embodiment, the packet may include any unit of data that is routed between an origin and a destination on the Internet or any other packet-switched network.

Such capture file may include a plurality of packets that make up a particular network communication. Thus, the capture file may be populated with packets at a previous time, and then processed in accordance with the method 300 at a desired later time. Of course, the present method 300 may be executed on data collected in real-time if feasible and desired by the user.

Next, a key associated with the packet of operation 302 is determined. Such key is associated with at least one layer of the packet that resides above a data link control (DLC) layer. In the context of the present description, such layer may include any appropriate layer that is not affected by situations involving two physical circuits (see FIG. 1A). By this design, the request-reply correlation problem associated with the prior art is avoided, since information at layers above the DLC layer do not vary if a request packet is sent on a circuit different from that on which an associated reply packet is received.

In the context of the present description, the key may refer to any information associated with at least one layer of the packet that resides above a DLC layer. In one embodiment, the key may include information at a remote procedure call (RPC) layer. In particular, the information may be an identifier included in an XID field at the RPC layer.

It is then determined whether the packet is a request packet or a reply packet in decision 306. If the packet includes a request packet, data associated with the request packet is stored in a hash table utilizing the key as an index into the hash table. See operation 320. As will soon become apparent, such data may include, at least in part, any data that is required for the reply packet to be properly decoded and analyzed, but is not included with the reply packet. For example, such data that is stored in the hash table may include a version number that is present in the request packet, but not present in the reply packet.

As an option, such data stored in operation 320 may refer to an "atom." In the context of the present description, an atom may refer to any data that may be stored and later retrieved for facilitating the processing of packets during the course of network analysis. Various types of atoms may be used. For example, circuit atoms may be used to collect data specific to a particular circuit. Still yet, packet atoms may be used to collect data specific to layers of a particular packet. Ideally, the data gathered in the present embodiment is stored in general purpose atoms. Such general purpose atoms are not tied to a particular circuit, packet, etc.; and may be used at any point during network analysis.

Next, the request packet is decoded. Note operation 322. Such decoding may refer to any translation of the request packet to a form that may be better analyzed by a user. For example, such decoding may include translating the request packet into an alphanumeric descriptive form based on the protocol associated with the request packet.

If, on the other hand, it is determined in decision 306 that the packet read in operation 302 includes a reply packet, it is determined whether the aforementioned key can be found in the context of the reply packet. Again, this key may be the same as that associated with the request packet (i.e. XID field at the RPC layer). If this key can not be found in the reply packet, the present method 300 is terminated. Note decision 308.

If, however, the key is found in decision 308, any data saved earlier in association with the corresponding request packet is retrieved from the hash table using the key. See operation 310. If, by chance, the data is not available as determined by decision 314, the present method 300 may be terminated. This may occur for various reasons. For example, the hash table may overflow for one reason or another.

Once it is determined that the data exists and it is retrieved in operation 310, the reply packet is correlated with the request packet using the key information. Note operation 316. Moreover, the reply packet is decoded using, at least in part, the data retrieved in operation 310, as necessary. See operation 318.

It is then determined whether another packet exists in the capture file. See decision 324. If not, the method 300 is terminated. If, however, it is determined that another packet exists in the capture file, such packet is selected in operation 326. The various operations 302–324 may then be repeated for each of the packets in the capture file during the course of the network analysis.

Figure 4:
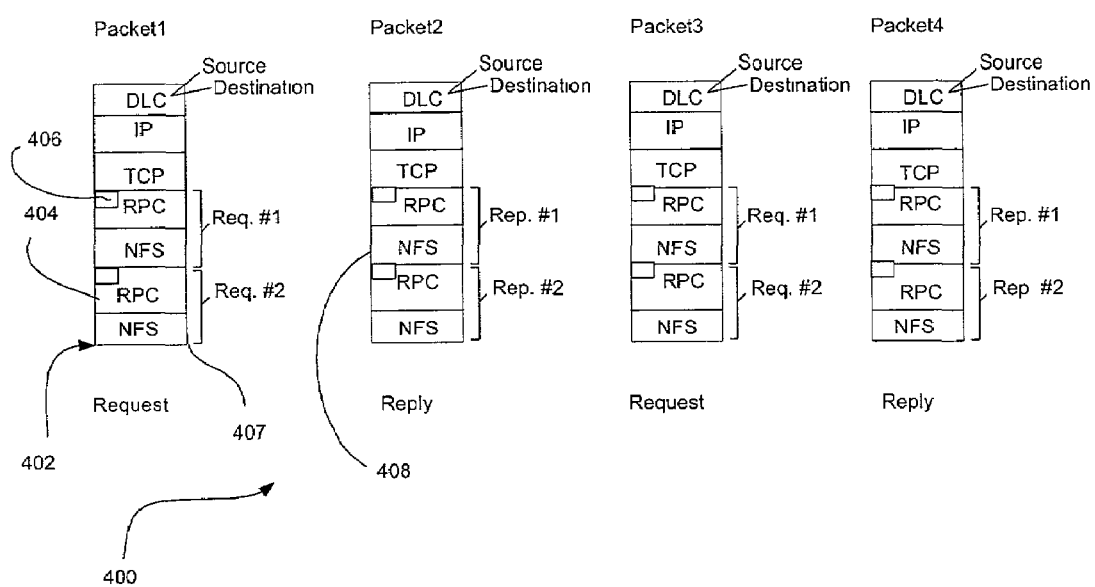
FIG. 4 illustrates an example of operation of the method of FIG. 3.

FIG. 4 illustrates an example of operation 400 of the method 300 of FIG. 3. While the present example is described in the context of the method 300 of FIG. 3, it should be noted that the principles set forth herein may be implemented in any desired manner.

As shown, a plurality of packets 400 are collected and stored in a capture file for subsequent analysis. A shown, such packets 402 include both request packets and reply packets. As mentioned earlier, both of such request and reply packets are decoded in order to properly analyze an associated network. Further, it is necessary to correlate the request and reply packets, since information that is often required to adequately decode the reply packets is only resident in the associated request packets.

In order to accomplish this, information (i.e. a key) is used that is associated with at least one layer of the packet that resides above the DLC layer thereof. As mentioned earlier, information may reside at a remote procedure call (RPC) layer 404. In particular, the information may be an identifier included in an XID field 406 at the RPC layer. As shown in FIG. 4, the RPC layer resides adjacent a network file system (NFS) layer 408.

In operation, numerous RPC and NFS layer combinations may be included in each request and reply packet. Despite such complication, each RPC and NFS layer combination includes a unique key in the XID field 406 of the associated RPC layer. As shown in FIG. 4, numerous request "sub-packets" of a request packet may be correlated with a plurality of sub-packets of a reply packet. In the context of the present description, it should be noted that the term packet is meant to include sub-packets.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for correlating request packets and reply packets during network analysis, comprising:
    (a) reading a packet from a capture file;
    (b) identifying a key associated with at least one layer of the packet that resides above a data link control layer;
    (c) determining whether the packet is a request packet or a reply packet;
    (d) if the packet includes a request packet:
        (i) storing data associated with the request packet in a hash table utilizing the key as an index into the hash table, and
        (ii) decoding the request packet;
    (e) if the packet includes a reply packet;
        (i) determining whether the reply packet includes the key,
        (ii) if the reply packet includes the key, retrieving the data associated with the request packet from the hash table utilizing the key,
        (iii) correlating the reply packet with the request packet associated with the data, and
        (iv) decoding the reply packet;
    (f) determining whether another packet exists in the capture file; and
    (g) repeating (a)–(f) if it is determined that another packet exists in the capture file.

2. A computer-implemented method for correlating request packets and reply packets during network analysis, comprising:
    (a) identifying a key associated with at least one layer of a packet that resides above a data link control layer;
    (b) responsive to the packet including a request packet:
        (i) storing data associated with the request packet utilizing the key as an index corresponding to the stored data, and
        (ii) decoding the request packet; and
    (c) responsive to the packet including a reply packet:
        (i) if the reply packet includes the key, retrieving the data associated with the request packet utilizing the key as the index corresponding to the data,
        (ii) correlating the reply packet with the request packet associated with the data, and
        (iii) decoding the reply packet using at least in part the retrieved data associated with the request packet.

3. The computer-implemented method as recited in claim 2, wherein the key includes information at a remote procedure call layer.

4. The computer-implemented method as recited in claim 2, wherein the information is included in an XID field.

5. The computer-implemented method as recited in claim 2, wherein storing data associated with the request packet comprises storing the data in a hash table using the key as an index into the hash table.

6. The computer-implemented method as recited in claim 2, wherein the packet is read from a capture file.

7. The computer-implemented method as recited in claim 2, wherein the packet is collected in real time.

* * * * *

UNITED STATES PATENT AND TRADEMARK OFFICE
CERTIFICATE OF CORRECTION

| | | |
|---|---|---|
| PATENT NO. | : 7,065,102 B1 | Page 1 of 1 |
| APPLICATION NO. | : 10/090315 | |
| DATED | : June 20, 2006 | |
| INVENTOR(S) | : David C. Petersen et al. | |

It is certified that error appears in the above-identified patent and that said Letters Patent is hereby corrected as shown below:

Column 7,

Line 2, replace "2" with --3--

Signed and Sealed this

Thirtieth Day of January, 2007

JON W. DUDAS
*Director of the United States Patent and Trademark Office*